United States Patent Office 3,370,109
Patented Feb. 20, 1968

3,370,109
PROCESS FOR PREPARING ESTERS OF
AMIDOIMIDODIPHOSPHORIC ACID
Morris L. Nielsen, Dayton, Ohio, assignor to Monsanto
Company, a corporation of Delaware
No Drawing. Filed Dec. 27, 1963, Ser. No. 333,999
5 Claims. (Cl. 260—968)

ABSTRACT OF THE DISCLOSURE

Esters of amidoimidodiphosphoric acid are prepared by reacting alkyl and aryl phosphoramidates with an alkali source such as an alkali, its amide or hydride at a temperature of from 60° C. to 250° C. A preferred proportion is from 0.3 to 4.0 gram atom of the alkali per gram atom of phosphorus.

---

The esters of amidoimidodiphosphoric acid are of utility as insecticides and biological toxicants, and as intermediates in the preparation of sequestering agents and alkali builders for detergent compositions.

The present invention relates to the process for preparation of esters of amidoimidodiphosphoric acid and alkali derivatives thereof, and improvements for the manufacture of such esters. Examples of such compounds include triphenyl amidoimidodiphosphate,

corresponding tolyl, xylyl, and naphthyl amidoimidodiphosphates and also the alkyl compounds such as the ethyl amidoimidodiphosphate. The process in addition to being applicable to the above compounds also is useful in making the nitro and sulfonate substituted compounds.

It is an object of the invention to prepare various esters of amidoimidodiphosphoric acid which are of utility as insecticides and biological toxicants, and as intermediates in the preparation of sequestering agents and alkaline builders for detergent compositions.

The reactants employed in the present invention are the group of unsubstituted, the nitro-substituted and the sulfonate-substituted alkyl and aryl phosphoramidates. Examples of alkyl and aryl phosphoramidates include ethyl, benzyl, phenyl, and naphthyl phosphoramidates of the general formula $(RO)_2P(O)NH_2$ where R is an organic group having from 1 to 16 carbon atoms, as exemplified by the presently named groups. This phosphoramidate is reacted with an alkali source selected from the group consisting of lithium, sodium, potassium, lithium amide, sodium amide, potassium amide, lithium hydride, sodium hydride and potassium hydride or broadly the alkali and alkaline earths, their amides and hydrides. It has been found that the desired compounds are obtained in high yield when this reaction is carried out at a temperature of from 60° to 250° C., or preferably from 60° C. to 160° C. In this temperature range the numerous possible byproducts and coproducts have been found to be minimized. The pressure is not an important variable, so that super-atmospheric and vacuum conditions may be employed as desired.

The organic compound and the alkali source are employed in the general proportion of from 0.3 to 4.0 or preferably from 0.5 to 2.0 gram atom of the alkali in free or combined form per gram atom of phosphorus. A specific preferred example is 1.0 gram atom of alkali per gram atom of phosphorus.

While the mechanism of the reaction has not been completely established, it is possible that it proceeds through the formation of an intermediate N-metal derivative shown by way of example, with the sodium alkali sources thus:

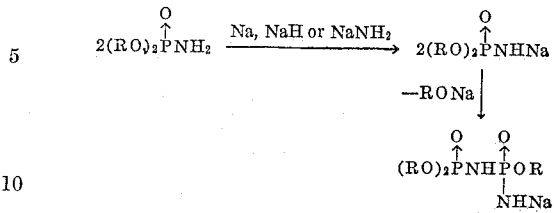

There is thus formed an alkali metal derivative of the ester of amidoimidodiphosphoric acid. This may exist in several isomeric forms:

or

The esters of the present invention such as trimethyl, triethyl, tributyl, triphenyl, tricresyl, and tri(nitrophenyl)-amidoimidodiphosphates are not readily obtainable by direct synthesis. However, it has been found that the present nitrogen-containing ester may be obtained by removing the metal content of the above alkali metal derivatives but with the retention of the nitrogen. The process of removing the alkali metal is carried out by ion exchange such as with an acid-treated zeolite or a sulfonated polystyrene resin. A preferred method however is to contact the aforesaid alkali metal derivative with an acid having a dissociation constant of at least $1 \times 10^{-8}$ such as hydrochloric, hydrobromic, hydriodic, hydrofluoric, sulfuric, sulfurous, phosphoric, and phosphorous acids and hydrogen sulfide.

The following examples illustrate specific embodiments of the present invention:

Example 1

Preparation of triphenyl amidoimidodiphosphate, $(C_6H_5O)_2P(O)NHP(O)(OC_6H_5)NH_2$. To 12.5 grams of diphenyl phosphoramidate (0.05 mole) in about two liters of dry benzene at 70° C. is added cautiously 1.2 g. sodium hydride (0.05 mole). As the reaction begins, there is an immediate evolution of hydrogen. The mixture is heated at reflux, the grey solids (sodium hydride) being gradually replaced by lighter-colored solids (mainly sodium phenoxide which is a byproduct of the reaction). After four hours the heating is terminated, the sludge is filtered off and the benzene solution concentrated by evaporation to a volume of about 600 ml. This solution is shaken several times with water to remove a sodium derivative of the desired product. The water extract is then acidified with dilute hydrochloric acid, whereupon a light-colored solid is precipitated. On drying in air, there results 7.5 grams of triphenyl amidodiphosphate amounting to a yield of 74%. The product is soluble in benzene, acetone, ethanol, or aqueous sodium hydroxide. It melts at 119–120° C. Nuclear magnetic resonance for $P^{31}$ shows two peaks, at −4.0 and +8.9 p.p.m. relative to $H_3PO_4$, which is consistent with the expected structure. Infrared spectrometry indicates absorptions for the amido ($NH_2$) and imido (NH) groups. X-ray diffraction analysis shows a unique pattern. The three most intense diffraction lines are given as follows, where the spacings in Angstroms are followed in parentheses by their relative intensities: 11.6 A (100); 4.311 (38); 4.914 (26).

*Analysis.*—Calc'd for $C_{18}H_{18}N_2O_5P_2$: C, 53.47; H, 4.49; N, 6.93; P, 15.32. Found: C, 53.39; H, 4.30; N, 7.17; P, 15.39.

Example 2

Preparation of triphenyl amidoimidodiphosphate. To 12.5 grams of diphenyl phosphoramidate (0.05 mole) in about 350 ml. dry toluene at 90° C. is added cautiously 2.2 g. of commercial sodium amide (0.05 mole). As the reaction begins, there is immediate evolution of ammonia. The mixture is heated at reflux for 4 hours, gradually forming a finely divided precipitate of sodium phenoxide, a byproduct. At the end of the heating period the mixture is cooled to about 50° C. and shaken repeatedly with water. On treating this aqueous solution, which contains the sodium derivative of triphenyl amidoimidodiphosphate, with dilute hydrochloric acid, the desired ester is precipitated. The product is filtered off, washed and air-dried to yield 8.6 g. (85%), M.P. 119° C.

*Example 3*

Preparation of triphenyl amidoimidodiphosphate. To 12.5 grams of diphenyl phosphoramidate (0.05 mole) in about 400 ml. dry xylene at 90° C. is added cautiously 0.345 g. of lithium (0.05 mole). After the initial evolution of hydrogen subsides, the mixture is heated at reflux for 2 hours. It is cooled, and shaken repeatedly with water to remove the lithium derivative of the product. Acidification of the aqueous phase with dilute sulfuric acid as a typical dilute mineral acid then yields the triphenyl amidoimidodiphosphate.

The present invention also contemplates the higher forms of the present compounds having additional phosphorus atoms in the molecule. Compounds of this type have the general formula

in which $n$ is a whole number of from 0 to 4 and in which R is an organic group having from 1 to 16 carbon atoms such as the phenyl, naphthyl or tolyl radical, as well as aliphatic radicals such as methyl, ethyl, propyl, butyl, etc.

In order to obtain the higher forms of the present compositions, the reaction is directed by further addition of the original reactants, e.g., phosphoramidates and the alkali source such as sodium, sodium hydride or sodium amide. In this way chain growth is continued on the already-formed amidoimido compound, for $n$ units ($n=0$ to 4).

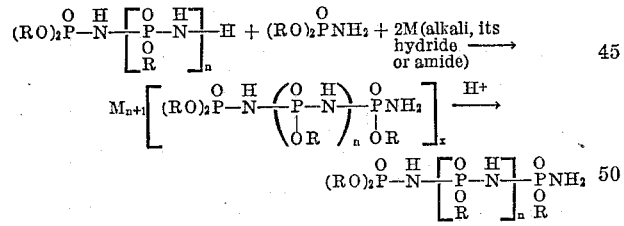

It is not necessary to isolate the intermediates at each stage although this can be done to reduce possible side reactions.

It has also been found that the use of higher reaction temperatures in the above range, e.g., such as from 100° C. to 250° C., or preferably from 100° C. to 160° C. promotes the higher molecular weight types. While the reaction time is not critical, the use of long reaction times is also conducive to the higher compounds.

The above type of compounds are illustrated in the following detailed examples.

*Example 4*

Preparation of tetraphenyl amidodiimidotriphosphate, $(C_6H_5O)_2P(O)NHP(O)(OC_6H_5)NHP(O)(OC_6H_5)NH_2$ To 12.5 grams of diphenyl phosphoramidate (0.05 mole) in about 500 ml. of dry toluene at 95° C. is added cautiously 0.6 g. sodium hydride (0.025 mole). After 10 minutes there is added an additonal 1.2 g. sodium hydride (0.05 mole). The mixture is heated at reflux for 30 minutes whereupon nearly all the grey color due to sodium hydride has disappeared. There is then added 6.25 g. of diphenylphosphoramidate (0.025 mole) and the mixture is refluxed for one hour. It is cooled to 90° C. and an additonal 1.8 g. of sodium hydride added. Finally the mixture is heated at reflux for an additional 2.5 hours. The mixture is cooled to 45° and about 200 ml. water adddded. The layers are separated and the water layer cooled to about 15° C. Addition of a slight excess of concentrated hydrochloric acid gives a crystalline precipitate of crude product, which when air-dried weighs about 8 grams, corresponding to a yield of about 20% of tetraphenyl amidodiimido triphosphates. On recrystallization from acetone, crystals are obtained melting at 158–60° C. The product is soluble in benzene, acetone, ethanol or aqueous sodium hydroxide. Nuclear magnetic resonance for $P^{31}$ shows three peaks, at $-0.8$, $+6.3$ and $+8.4$ p.p.m. relative to 85% $H_3PO_4$, which is consistent with the expected structure. Infrared spectrometry indicates absorptions for the amido ($NH_2$) and imido (NH) groups. X-ray diffraction analysis shows a unique pattern. The three most intense diffraction lines are given as follows, where the spacings in Angstroms are followed in parentheses by their relative intensities: 11.3(100), 11.9(50) 12.5(10).

*Analysis.*—Calc'd for $C_{24}H_{24}N_3O_7P_3$: C, 51.53; H, 4.32; N, 7.51; P, 16.61. Found: C, 51.29; H, 4.43; N, 7.52; P, 16.90.

What is claimed is:

1. Process for making an amidoimidodiphosphate ester $(RO)_2P(O)NHP(O)(NH_2)OR$ wherein R is selected from the group consisting of aryl radicals having from 6 to 16 carbon atoms, which process comprises heating a compound selected from the group consisting of aryl phosphoramidates having from 6 to 16 carbon atoms with an alkali source selected from the group consisting of lithium, sodium, potassium, lithium amide, sodium amide, potassium amide, lithium hydride, sodium hydride, and potassium hydride at a temperature in the range of from 60° C. to 250° C., and thereafter contacting the resultant alkali metal derivative with an acid selected from the group consisting of hydrochloric, hydrobromic, hydroiodic, hydrofluoric, sulfuric, sulfurous, phosphoric, phosphorous acids and hydrogen sulfide, and recovering therefrom the said amidoimidodiphosphate ester.

2. The process for making amidoimidophosphate esters having the formula

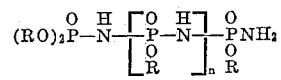

where $n$ is a whole number of from 0 to 4 and R is an aryl radical having from 6 to 16 carbon atoms, which process comprises heating a compound having the formula

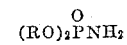

at a temperature of from 100° C. to 250° C. in the presence of an alkali material selected from the group consisting of lithium, sodium, potassium, lithium amide, sodium amide, potassium amide, lithium hydride, sodium hydride, and potassium hydride, and thereafter contracting the resultant alkali metal derivative with an acid selected from the group consisting of hydrochloric, hydrobromic, hydroiodic, hydrofluoric, sulfuric, sulfurous, phosphoric, phosphorous acids and hydrogen sulfide, and recovering therefrom the said amidoimidodiphosphate ester.

3. The process for making the compound

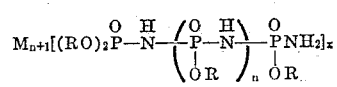

where R is an aryl radical having from 6 to 16 carbon atoms, $n$ is a whole number from 0 to 4, M is a metal selected from the group consisting of alkali metals, and $x$ is the valence of the metal M, by heating the compound

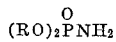

in the presence of an alkali source selected from the group consisting of lithium, sodium, potassium, lithium amide, sodium amide, potassium amide, lithium hydride, sodium hydride and potassium hydride at a temperature in the range of from 60° C. to 250° C.

4. Process for making a compound having the formula $(RO)_2P(O)NHP(O)(NH_2)OR$ where R is selected from the group consisting of aryl radicals having from 6 to 16 carbon atoms by the removal of metal atoms from a metal derivative $M[(RO)_2P(O)NP(O)(NH_2)OR]_x$ where M is a metal selected from the group consisting of alkali metals, and $x$ is the valence of the metal M, which process comprises contacting the said metal compound with an acid selected from the group consisting of hydrochloric, hydrobromic, hydroiodic, hydrofluoric, sulfuric, sulfurous, phosphoric, phosphorous acids and hydrogen sulfide, and recovering therefrom the compound having the formula $(RO)_2P(O)NHP(O)(NH_2)OR$.

5. The process for making amidoimidophosphate esters having the formula

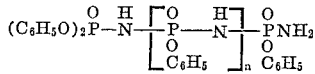

where $n$ is a whole number of from 0 to 4, which process comprises heating the next lower member of the series, having the formula

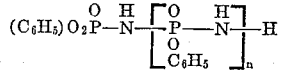

at a temperature of from 100° C. to 250° C. in the presence of $(C_6H_5)_2PNH_2$ and an alkali material selected from the group consisting of lithium, sodium, potassium, lithium amide, sodium amide, potassium amide, lithium hydride, sodium hydride, and potassium hydride, and thereafter contacting the resultant alkali metal derivative with an acid selected from the group consisting of hydrochloric, hydrobromic, hydroiodic, hydrofluoric, sulfuric, sulfurous, phosphoric, phosphorous acids and hydrogen sulfide, and recovering therefrom the said amidoimidodiphosphate ester.

No references cited.

CHARLES B. PARKER, *Primary Examiner.*

A. H. SUTTO, *Assistant Examiner.*